(12) United States Patent
Park et al.

(10) Patent No.: US 12,687,489 B2
(45) Date of Patent: Jul. 21, 2026

(54) PROBE AND INSPECTION APPARATUS INCLUDING THE SAME

(71) Applicant: Samsung Electronics Co., Ltd., Suwon-si (KR)

(72) Inventors: Junbum Park, Suwon-si (KR); Namil Koo, Suwon-si (KR); Jaeho Kim, Suwon-si (KR); Jongsu Kim, Suwon-si (KR); Suhwan Park, Suwon-si (KR); Sangwoo Bae, Suwon-si (KR); Inkeun Baek, Suwon-si (KR); Ikseon Jeon, Suwon-si (KR); Martin Priwisch, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 364 days.

(21) Appl. No.: 18/220,672

(22) Filed: Jul. 11, 2023

(65) Prior Publication Data

US 2024/0019362 A1     Jan. 18, 2024

(30) Foreign Application Priority Data

Jul. 13, 2022     (KR) ........................ 10-2022-0086541

(51) Int. Cl.
*G01N 21/3581*     (2014.01)
*G01N 21/956*     (2006.01)

(52) U.S. Cl.
CPC ....... *G01N 21/3581* (2013.01); *G01N 21/956* (2013.01); *G01N 2021/95676* (2013.01)

(58) Field of Classification Search
CPC ............. G01N 21/3581; G01N 21/956; G01N
2021/95676; G01N 21/8806; G01N
21/9501; G01N 21/3586; G01J 3/42;
G01R 29/0878; G01R 1/0491; G01R
1/06772; G01R 31/2896; G01R 31/303;
G01R 1/06733; G01R 31/307; H01Q 1/38
See application file for complete search history.

(56) References Cited

U.S. PATENT DOCUMENTS

| | | | |
|---|---|---|---|
| 5,708,273 | A | 1/1998 | VonBargen |
| 6,747,736 | B2 | 6/2004 | Takahashi |
| 7,531,802 | B2 | 5/2009 | Zhang et al. |
| 7,894,126 | B2 | 2/2011 | Gunter et al. |
| 8,115,693 | B2 | 2/2012 | Salsman et al. |

(Continued)

FOREIGN PATENT DOCUMENTS

| | | | |
|---|---|---|---|
| JP | 3904283 | B2 | 4/2007 |
| JP | 2007517231 | A | 6/2007 |

(Continued)

*Primary Examiner* — Uzma Alam
*Assistant Examiner* — Gisselle M Gutierrez
(74) *Attorney, Agent, or Firm* — Muir Patent Law, PLLC

(57)     ABSTRACT

An inspection apparatus is provided. The inspection apparatus includes a substrate extending in a first direction and a second direction perpendicular to the first direction, a receiver antenna arranged on the substrate and including first and second antenna electrodes, a first waveguide on the substrate, and a second waveguide on the substrate, wherein the first antenna electrode overlaps the first waveguide in a third direction that is perpendicular to the first direction and the second direction, and the second antenna electrode overlaps the second waveguide in the third direction.

12 Claims, 10 Drawing Sheets

(56)          References Cited

U.S. PATENT DOCUMENTS

| | | | |
|---|---|---|---|
| 9,927,355 | B2 | 3/2018 | Giles et al. |
| 10,006,960 | B2 | 6/2018 | Cole |
| 10,175,111 | B2 | 1/2019 | Ozaki et al. |
| 11,726,136 | B2 | 8/2023 | Cole |

FOREIGN PATENT DOCUMENTS

| | | | | | |
|---|---|---|---|---|---|
| JP | 2007327897 | A | 12/2007 | | |
| JP | 4800244 | B2 | 10/2011 | | |
| KR | 1019990040323 | A | 6/1999 | | |
| KR | 1020160110615 | A | 9/2016 | | |
| KR | 1020180024225 | A | 3/2018 | | |
| KR | 1020200076835 | A | 6/2020 | | |
| KR | 1020220006404 | A | 1/2022 | | |
| KR | 1020220034494 | A | 3/2022 | | |
| TW | 1261680 | B | 9/2006 | | |
| TW | 1567398 | B | 1/2017 | | |
| TW | I891021 | B | * 7/2025 | ......... | G01N 21/3581 |
| WO | 2010091754 | A1 | 8/2010 | | |

* cited by examiner

101

PROBE AND INSPECTION APPARATUS INCLUDING THE SAME

CROSS-REFERENCE TO RELATED APPLICATION

This application is based on and claims priority under 35 U.S.C. § 119 to Korean Patent Application No. 10-2022-0086541, filed on Jul. 13, 2022, in the Korean Intellectual Property Office, the disclosure of which is incorporated by reference herein in its entirety.

BACKGROUND

Aspects of the inventive concept relate to a probe and an inspection apparatus including the probe, and more particularly, to a probe using air plasma and an inspection apparatus including the probe.

Recently, along with the drastic development of techniques of generating and detecting terahertz waves, terahertz-related application research has been performed in various fields, such as biology, chemistry, mechanical engineering, radio-communication engineering, and the like. Unlike X-rays which may cause damage and/or property change of samples or inspection objects due to the strong energy thereof, terahertz waves, which are non-ionizing electromagnetic waves having low-level energy, are less likely to cause the damage or property change of inspection objects. Therefore, terahertz-wave inspection has been variously applied to non-contact non-destructive inspection applications.

A representative application of terahertz waves in the semiconductor industry is quality evaluation of integrated circuits and semiconductor packages. Although terahertz waves have a drawback of being unable to penetrate metal patterns formed inside semiconductor chips due to radio-wave characteristics thereof, terahertz waves are able to penetrate polymer materials in packages well, and thus, may be applied to package inspection. Terahertz-wave inspection may also be applied to wafer-level tests. In addition, inspection methods using terahertz waves are facilitated to be applied to non-contact in-line processes, because terahertz waves are capable of propagating in free spaces and thus have no need to be provided with media, and because there is no need to directly contact inspection objects.

SUMMARY

Aspects of the inventive concept provide a broadband terahertz probe having an increased bandwidth and a system including the broadband terahertz probe.

According to an aspect of the inventive concept, there is provided an inspection apparatus. The inspection apparatus includes a substrate extending in a first direction and a second direction perpendicular to the first direction, a receiver antenna arranged on the substrate and including first and second antenna electrodes, a first waveguide on the substrate, and a second waveguide on the substrate, wherein the first antenna electrode overlaps the first waveguide in a third direction that is perpendicular to the first direction and the second direction, and the second antenna electrode overlaps the second waveguide in the third direction.

According to another aspect of the inventive concept, there is provided an inspection apparatus. The inspection apparatus includes a receiver antenna including a first antenna electrode and a second antenna electrode arranged apart from each other with a gap therebetween, a first waveguide adjacent to the gap, and a second waveguide adjacent to the gap, wherein the receiver antenna is configured to generate plasma in the gap and couple the plasma with a terahertz band signal from an inspection object, the first waveguide is configured to introduce a first laser beam with a first frequency into the gap, and the second waveguide is configured to transfer a second laser beam with a second frequency, the second laser beam being generated in response to the plasma, the terahertz band signal, and the first laser beam.

According to yet another aspect of the inventive concept, there is provided an inspection apparatus including a probe, a power supply configured to provide AC and/or DC power to the probe, and an optical system configured to provide a first laser beam to the probe and receive, from the probe, a second laser beam generated in response to the first laser beam. The probe includes a receiver antenna configured to apply an AC and/or DC bias to a gap in the receiver antenna, based on the AC and/or DC power, a first waveguide providing a path for transferring the first laser beam, and a second waveguide providing a path for transferring the second laser beam, wherein the first and second waveguides are bent toward the receiver antenna and arranged apart from each other with the gap therebetween.

BRIEF DESCRIPTION OF THE DRAWINGS

Example embodiments will be more clearly understood from the following detailed description taken in conjunction with the accompanying drawings in which.

DETAILED DESCRIPTION OF THE EMBODIMENTS

Figure 1A:
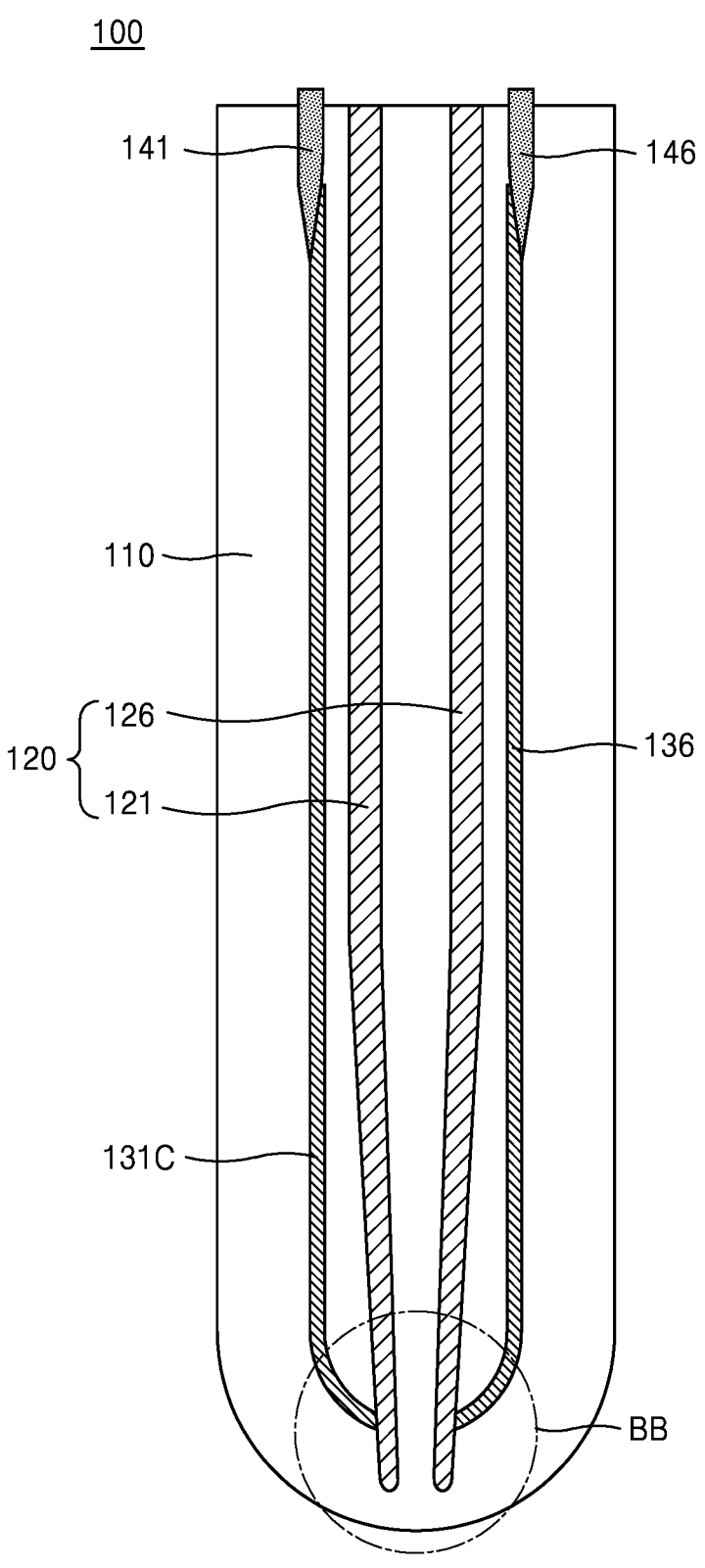
FIG. 1A is a schematic diagram illustrating a probe according to some embodiments.

Hereinafter, embodiments of the inventive concept will be described in detail with reference to the accompanying drawings. Like components are denoted by like reference numerals throughout the specification, and repeated descriptions thereof are omitted.

FIG. 1A is a schematic diagram illustrating a probe 100 according to some embodiments.

Figure 1B:
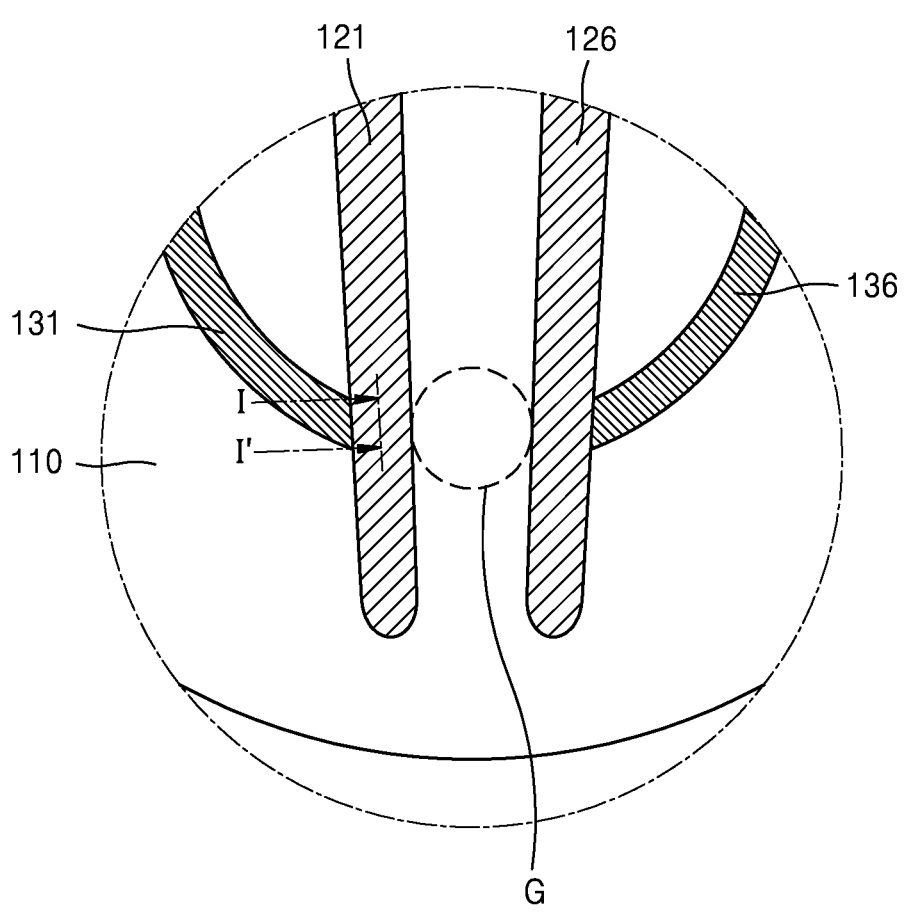
FIG. 1B is an enlarged view of a region BB of FIG. 1A.

FIG. 1B is an enlarged view of a region BB of FIG. 1A.

Figure 1C:
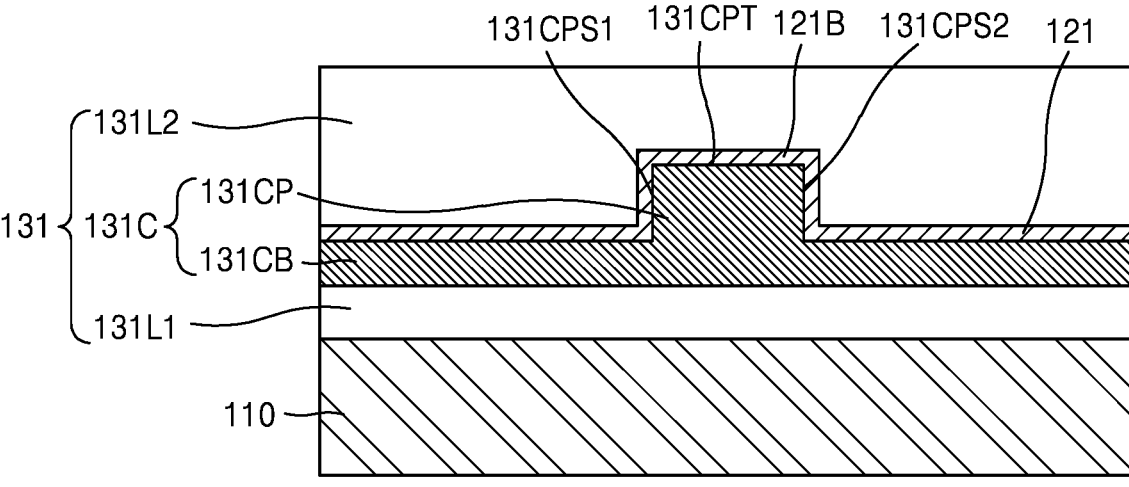
FIG. 1C is a cross-sectional view taken along a line I-I' of FIG. 1B.
Figure 1C:
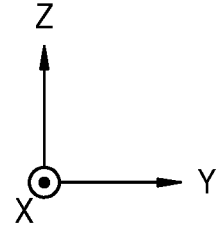

FIG. 1C is a cross-sectional view taken along a line I-I' of FIG. 1B.

Referring to FIGS. 1A to 1C, the probe 100 may include a substrate 110, a receiver antenna 120, first and second waveguides 131 and 136, and first and second couplers 141 and 146.

According to some embodiments, the substrate 110 may include, for example, a semiconductor material, such as silicon.

The receiver antenna 120 may be arranged on the substrate 110. The receiver antenna 120 may extend in one direction. The receiver antenna 120 may include a dipole antenna. The receiver antenna 120 may include a first antenna electrode 121 and a second antenna electrode 126. According to some embodiments, the first and second antenna electrodes 121 and 126 may be positioned apart from each other. An interval between the first and second electrodes 121 and 126 may decrease towards an end portion of the receiver antenna 120. Here, the end portion of the receiver antenna 120 may be a portion by which a signal in a terahertz band is received.

According to some embodiments, each of the first and second antenna electrodes 121 and 126 may include a conductive material. According to some embodiments, each of the first and second antenna electrodes 121 and 126 may include a metal. According to some embodiments, each of the first and second antenna electrodes 121 and 126 may include or may be formed of a noble metal, such as Au, Ag, and Cu.

According to some embodiments, a DC and/or AC bias may be applied to the first and second antenna electrodes 121 and 126. The DC and/or AC bias applied to the first and second antenna electrodes 121 and 126 may generate plasma in a gap G. According to some embodiments, the magnitude of the DC bias may be 1 kV or less. According to some embodiments, the peak-to-peak magnitude of the AC bias may be 500 V or less. According to some embodiments, the frequency of the AC bias may be hundreds of MHz.

According to some embodiments, the gap G may be filled with air. Alternatively, the gap G may be filled with at least one selected from a hydrocarbon gas, oxygen, and hydrogen. The plasma generated in the gap G includes a chemical species. The chemical species may be a carrier for sensing a terahertz band signal.

The receiver antenna 120 may couple the terahertz band signal with the gap G (or the plasma generated in the gap G). The terahertz band signal may penetrate a sample (for example, a semiconductor wafer), which is an inspection object, and then be coupled with the gap G by the receiver antenna 120. The terahertz band signal may oscillate the carrier (that is, the chemical species) of the plasma of the gap G.

A receiver antenna according to the related art includes a photoconductive switch formed on a semiconductor substrate. The mobility of a carrier (that is, an electron or a hole) of the photoconductive switch is limited by defects and the like included in the semiconductor substrate and thus has a relatively low value.

The chemical species of the plasma has higher mobility than the carrier of the photoconductive switch. Therefore, the bandwidth of the terahertz band signal, which is sensible by the receiver antenna 120 of the probe 100 according to some embodiments, may be increased, and thus, the property analysis performance of the probe 100 may be improved.

The first and second waveguides 131 and 136 may be arranged on the substrate 110. The first and second waveguides 131 and 136 may be respectively configured to transfer first and second laser beams described below. The first waveguide 131 may provide a path for transferring the first laser beam, and the second waveguide 136 may provide a path for transferring the second laser beam. Each of the first and second waveguides 131 and 136 may have a bent shape. Each of the first and second waveguides 131 and 136 may be horizontally bent. Each of the first and second waveguides 131 and 136 may be bent toward the receiver antenna 120. Accordingly, the receiver antenna 120 and the first and second waveguides 131 and 136 may share the gap G. For example, ends of the receiver antenna 120 and ends of the first and second waveguides 131 and 136 may be adjacent to the gap G, such that the gap G may be disposed between the ends of the receiver antenna 120 and the ends of the first and second waveguides 131 and 136.

The first laser beam having a first frequency may be introduced into the gap G through the first waveguide 131. The second laser beam having a second frequency may be generated due to interactions between the plasma of the gap G, the terahertz band signal, and the first laser beam. The receiver antenna 120 may couple the terahertz band signal with the gap G simultaneously with generating the plasma in the gap G, and as a result, may cause the second laser beam to be generated.

Accordingly, the terahertz band signal may affect the second laser beam. More specifically, the frequency and intensity of the second laser beam may be proportional to the strength of the terahertz band signal. Therefore, the measurement of the intensity of the second laser beam and the frequency analysis of the second laser beam allow the property analysis using the terahertz band signal.

The second laser beam may be generated by a nonlinear optical phenomenon. According to some embodiments, the second laser beam may be generated by sum frequency generation (SFG). The second frequency of the second laser beam may be different from the first frequency of the first laser beam.

Accordingly, the first and second frequencies may satisfy the following Equation 1.

$$f_2 = 2f_1 + f_{THZ} \qquad \text{[Equation 1]}$$

In Equation 1, $f_1$ is the first frequency, $f_2$ is the second frequency, and $f_{THZ}$ is the frequency of the terahertz-band signal. Here, the frequency of the terahertz-band signal, that is, $f_{THZ}$, may be relatively lower than the first and second frequencies, that is, $f_1$ and $f_2$. Therefore, Equation 2 may be approximately established.

$$f_2 \approx 2f_1 \qquad \text{[Equation 2]}$$

For example, when the first laser beam has a wavelength of about 1560 nm, the second laser beam may have a wavelength of about 780 nm.

The plasma of the gap G may generate the second laser beam by using various nonlinear optical phenomena, such as second-order, third-order, and fourth or more-order nonlinear optical phenomena, in addition to the SFG.

Here, examples of the second-order nonlinear optical phenomena may include second harmonic generation (SHG) and an optical parametric process.

Examples of the third-order nonlinear optical phenomena include third harmonic generation (THG), third-order SFG (TSFG), four-wave mixing (FWM), stimulated Raman scattering (SRS), optical Kerr effect (OKE), Raman-induced Kerr effect (RIKE), stimulated Rayleigh scattering, stimulated Brillouin scattering (SBS), stimulated Kerr scattering, stimulated Rayleigh-Bragg scattering, stimulated Mie scattering, self-phase modulation (SPM), cross-phase modulation (XPM), optical-field-induced birefringence, and electric-field-induced SHG.

Examples of the fourth or more-order nonlinear optical phenomena include hyper-Raman scattering, hyper-Rayleigh scattering, and coherent anti-Stokes hyper-Raman scattering.

The first laser beam may include a pulsed laser beam. A plurality of pulses (that is, a pulse train) of the first laser beam may penetrate a sample and thus be transferred to the probe 100.

Here, the intensity of the second laser beam is proportional to the strength of the terahertz band signal. Accordingly, by sensing the intensity of the second laser beam, the strength of the terahertz band signal may be determined. The second laser beam may be output to the outside of the probe 100 through the second waveguide 136 and may be sensed by an optical sensor, for example, a charge-coupled device (CCD) camera and a complementary metal oxide semiconductor (CMOS) image sensor.

Hereinafter, a direction that is substantially perpendicular to an upper surface of the substrate 110 is defined as a Z direction, and directions that are substantially parallel to the upper surface of the substrate 110 are respectively defined as an X direction and a Y direction. The X direction, the Y direction, and the Z direction may be substantially perpendicular to each other.

The first antenna electrode 121 may extend to pass through the first waveguide 131. The first waveguide 131 and the first antenna electrode 121 may overlap each other in the Z direction.

The first waveguide 131 may include a rib waveguide. The first waveguide 131 may include a first lower cladding 131L1, a first core 131C, and a first upper cladding 131L2.

According to some embodiments, the first lower cladding 131L1, the first core 131C, and the first upper cladding 131L2 may be sequentially arranged on the substrate 110 in the stated order. According to some embodiments, the first lower cladding 131L1 may be arranged on the substrate 110, the first core 131C may be arranged on the first lower cladding 131L1, and the first upper cladding 131L2 may be arranged on the first core 131C.

According to some embodiments, the first core 131C may include a material having a refractive index that is higher than the refractive index of each of the first lower cladding 131L1 and the first upper cladding 131L2. For example, each of the first lower cladding 131L1 and the first upper cladding 131L2 may include silicon oxide, and the first core 131C may include silicon. As another example, each of the first lower cladding 131L1 and the first upper cladding 131L2 may include silicon nitride, and the first core 131C may include silicon.

The first core 131C may include a first base 131CB and a first protrusion 131CP. The first base 131CB may have a certain thickness in the Z direction. The first protrusion 131CP may protrude from the first base 131CB. Accordingly, the first protrusion 131CP may include first and second side surfaces 131CPS1 and 131CPS2 and an upper surface 131CPT.

The first antenna electrode 121 may be arranged between the first upper cladding 131L2 and the first core 131C. For example, the first antenna electrode 121 may be in contact with the first upper cladding 131L2 and the first core 131C. The first antenna electrode 121 may have a uniform thickness. Accordingly, the shape of the first core 131C may be transferred to the first antenna electrode 121. According to some embodiments, the first antenna electrode 121 may have a conformal shape, and thus, may include a bent portion 121B. It will be understood that when an element is referred to as being "connected" or "coupled" to or "on"

another element, it can be directly connected or coupled to or on the other element or intervening elements may be present. In contrast, when an element is referred to as being "directly connected" or "directly coupled" to another element, or as to "contact," "contacting," or "in contact with" another element, there are no intervening elements present at the point of contact.

According to some embodiments, the bent portion 121B of the first antenna electrode 121 may cover the first and second side surfaces 131CPS1 and 131CPS2 and the upper surface 131CPT of the first protrusion 131CP. According to some embodiments, the bent portion 121B of the first antenna electrode 121 may contact the first and second side surfaces 131CPS1 and 131CPS2 and the upper surface 131CPT of the first protrusion 131CP.

According to some embodiments, the first antenna electrode 121 may have a symmetric structure to the second antenna electrode 126, and the first waveguide 131 may have a symmetric structure to the second waveguide 136. Accordingly, the descriptions made above regarding the shapes and arrangements of the first antenna electrode 121 and the first waveguide 131 may be similarly applied to the shapes and arrangements of the second antenna electrode 126 and the second waveguide 136.

More specifically, the second waveguide 136 may include a second lower cladding, a second core, and a second upper cladding, and the shapes and arrangements thereof are substantially the same as described regarding the first lower cladding 131L1, the first core 131C, and the first upper cladding 131L2.

According to some embodiments, the first and second waveguides 131 and 136 may be arranged adjacent to the end portion of the receiver antenna 120 to share the gap G with the receiver antenna 120. Therefore, because there is no need of the alignment of an excited laser beam for generating a signal (here, the second laser beam) that is based on the terahertz band signal, the speed and accuracy of inspection may be improved. In addition, optics are integrated into the probe 100, and thus, the probe 100 that is compact may be provided.

The first coupler 141 may couple the first waveguide 131 with external optics (for example, free-space optics, optical-fiber optics, or other optical integrated circuits), and the second coupler 146 may couple the second waveguide 131 with external optics (for example, free-space optics, optical-fiber optics, or other optical integrated circuits). Accordingly, the first laser beam from external optics may be introduced into the first waveguide 131, and the second laser beam transferred through the second waveguide 136 may be introduced into external optics.

Figure 2A:
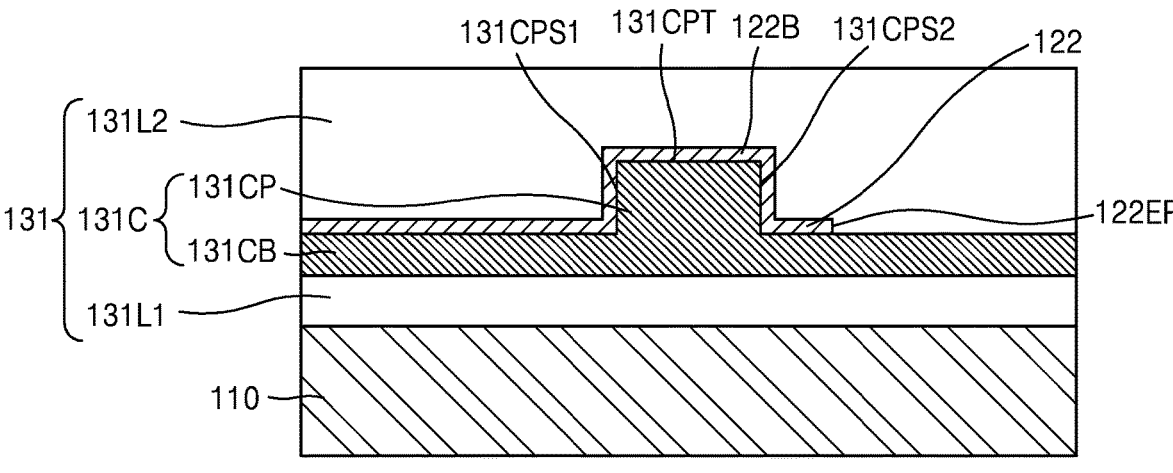
FIG. 2A is a cross-sectional view illustrating a probe according to some embodiments.
Figure 2A:
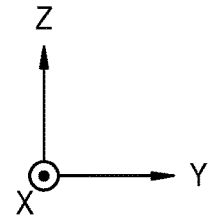

FIG. 2A is a cross-sectional view illustrating a probe according to some embodiments. More specifically, FIG. 2A is a cross-sectional view of the same region as in FIG. 1C.

In the present example, because the first lower cladding 131L1, the first core 131C, and the first upper cladding 131L2 are substantially the same as described with reference to FIGS. 1A to 1C, repeated descriptions thereof are omitted.

The first antenna electrode 122 may include a bent portion 122B, which covers the first and second side surfaces 131CPS1 and 131CPS2 and the upper surface 131CPT of the first protrusion 131CP of the first core 131C. The first antenna electrode 122 may extend not to pass through the first waveguide 131, unlike the first antenna electrode 121 of FIG. 1C. That is, an end portion 122EP of the first antenna electrode 122 may overlap the first base 131CB of the first core 131C in the Z direction.

Figure 2B:
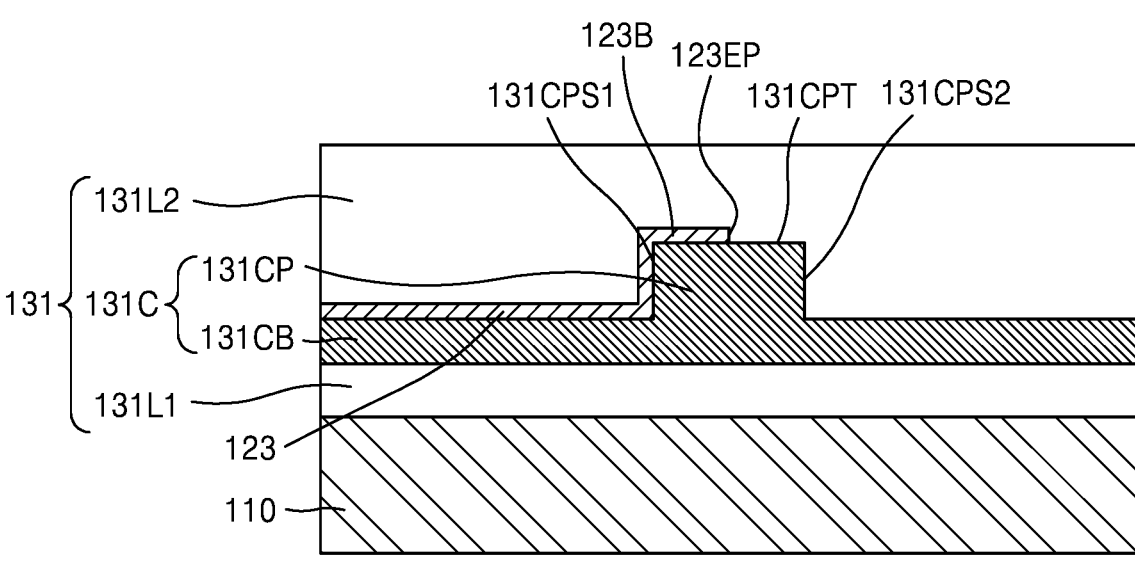
FIG. 2B is a cross-sectional view illustrating a probe according to some embodiments.
Figure 2B:
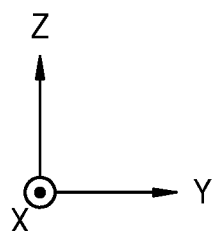

FIG. 2B is a cross-sectional view illustrating a probe according to some embodiments. More specifically, FIG. 2B is a cross-sectional view of the same region as in FIG. 1C.

In the present example, because the first lower cladding 131L1, the first core 131C, and the first upper cladding 131L2 are substantially the same as described with reference to FIGS. 1A to 1C, repeated descriptions thereof are omitted.

According to some embodiments, an end portion 123EP of a first antenna electrode 123 may overlap the upper surface 131CPT of the first protrusion 131CP of the first core 131C in the Z direction. According to some embodiments, the end portion 123EP of the first antenna electrode 123 may contact the upper surface 131CPT of the first protrusion 131CP of the first core 131C. According to some embodiments, the first antenna electrode 123 may partially cover the first protrusion 131CP of the first core 131C. Accordingly, the first antenna electrode 123 may include a bent portion 123B contacting the first protrusion 131CP of the first core 131C.

According to some embodiments, the first antenna electrode 123 may cover the first side surface 131CPS1 of the first protrusion 131CP and may expose (i.e., not cover) the second side surface 131CPS2 of the first protrusion 131CP, which is opposite to the first side surface 131CP Sl. According to some embodiments, the first antenna electrode 123 may contact the first side surface 131CPS1 of the first protrusion 131CP and may be apart from (i.e., does not contact) the second side surface 131CPS2 of the first protrusion 131CP.

Figure 2C:
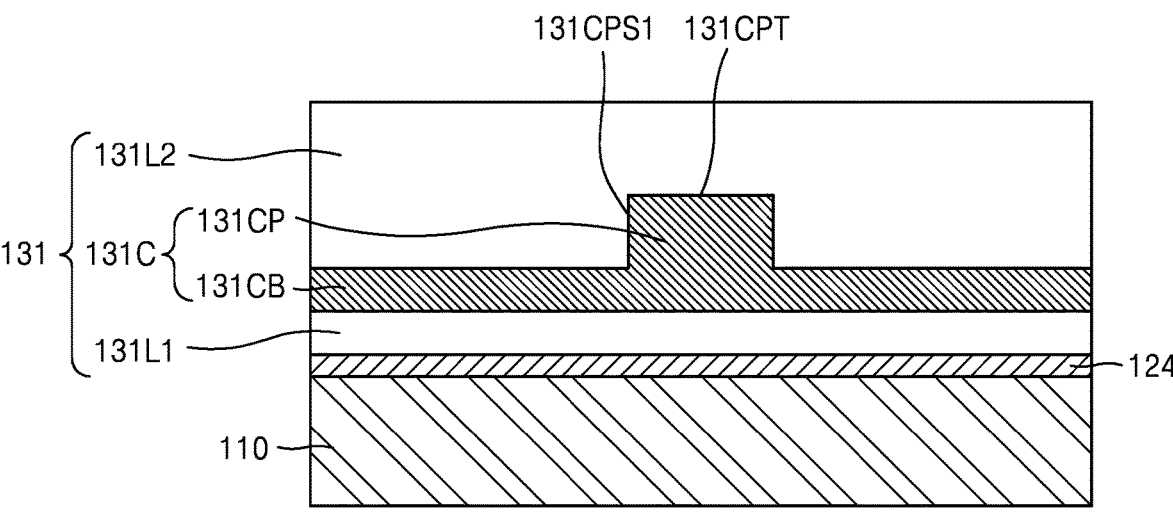
FIG. 2C is a cross-sectional view illustrating a probe according to some embodiments.
Figure 2C:
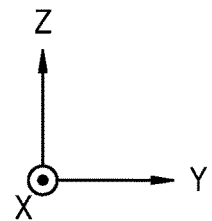

FIG. 2C is a cross-sectional view illustrating a probe according to some embodiments. More specifically, FIG. 2C is a cross-sectional view of the same region as in FIG. 1C.

In the present example, because the first lower cladding 131L1, the first core 131C, and the first upper cladding 131L2 are substantially the same as described with reference to FIGS. 1A to 1C, repeated descriptions thereof are omitted.

According to some embodiments, a first antenna electrode 124 may be arranged between the substrate 110 and the first waveguide 131. Accordingly, the first antenna electrode 124 may not include a bent portion, unlike the first antenna electrode 121 of FIG. 1C.

Figure 2D:
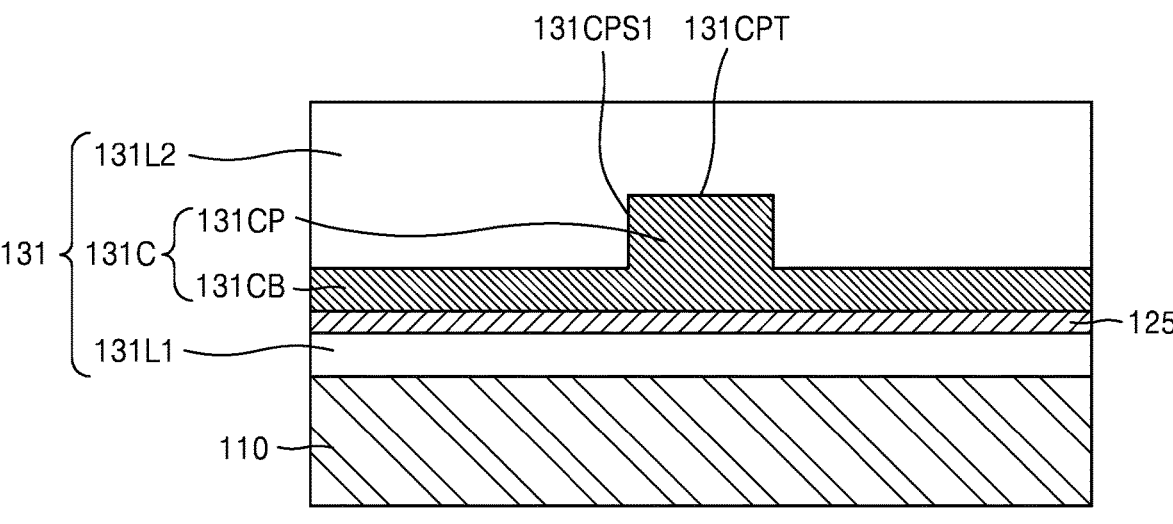
FIG. 2D is a cross-sectional view illustrating a probe according to some embodiments.
Figure 2D:
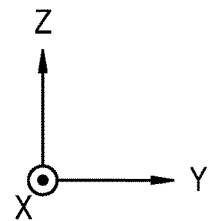

FIG. 2D is a cross-sectional view illustrating a probe according to some embodiments. More specifically, FIG. 2D is a cross-sectional view of the same region as in FIG. 1C.

In the present example, because the first lower cladding 131L1, the first core 131C, and the first upper cladding 131L2 are substantially the same as described with reference to FIGS. 1A to 1C, repeated descriptions thereof are omitted.

According to some embodiments, a first antenna electrode 125 may be arranged between the first lower cladding 131L1 and the first core 131C. Accordingly, the first antenna electrode 125 may not include a bent portion, unlike the first antenna electrode 121 of FIG. 1C. The first antenna electrode 125 may contact the first lower cladding 131L1 and the substrate 110.

Figure 2E:
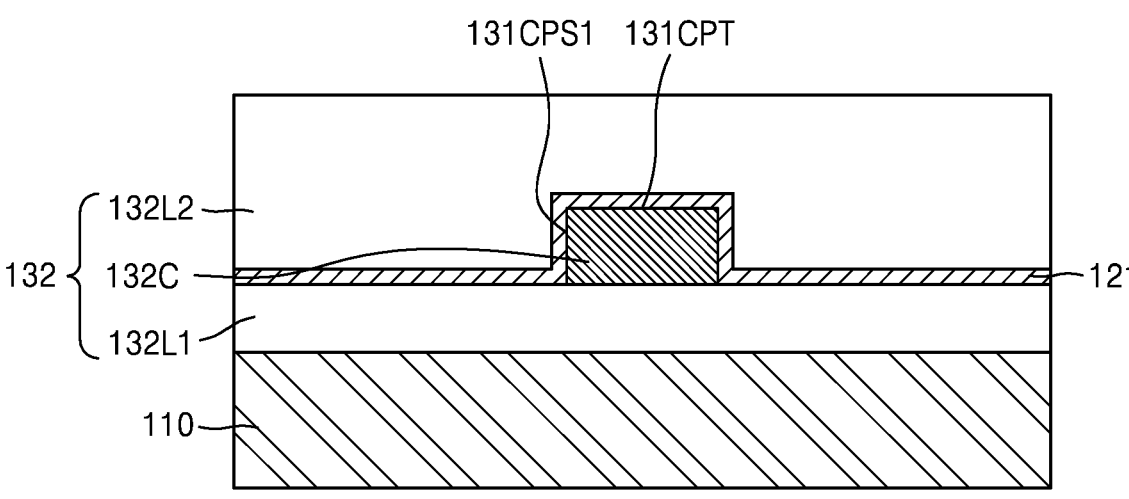
FIG. 2E is a cross-sectional view illustrating a probe according to some embodiments.
Figure 2E:
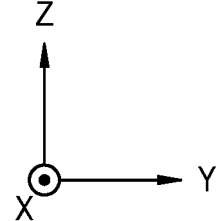

FIG. 2E is a cross-sectional view illustrating a probe according to some embodiments. More specifically, FIG. 2E is a cross-sectional view of the same region as in FIG. 1C.

According to some embodiments, a first waveguide 132 may include a first lower cladding 132L1, a first core 132C, and a first upper cladding 132L2.

The first waveguide 132 may include a strip waveguide. Accordingly, the first core 132C may not include the first base 131CB, unlike the first core 131C of FIG. 1C.

Because the substrate 110 and the first antenna electrode 121 are substantially the same as described with reference to FIGS. 1A to 1C, repeated descriptions thereof are omitted.

The first lower cladding 132L1 and the first upper cladding 132L2 are respectively the same as the first lower cladding 131L1 and the first upper cladding 131L2 of FIG. 1C.

Figure 3:
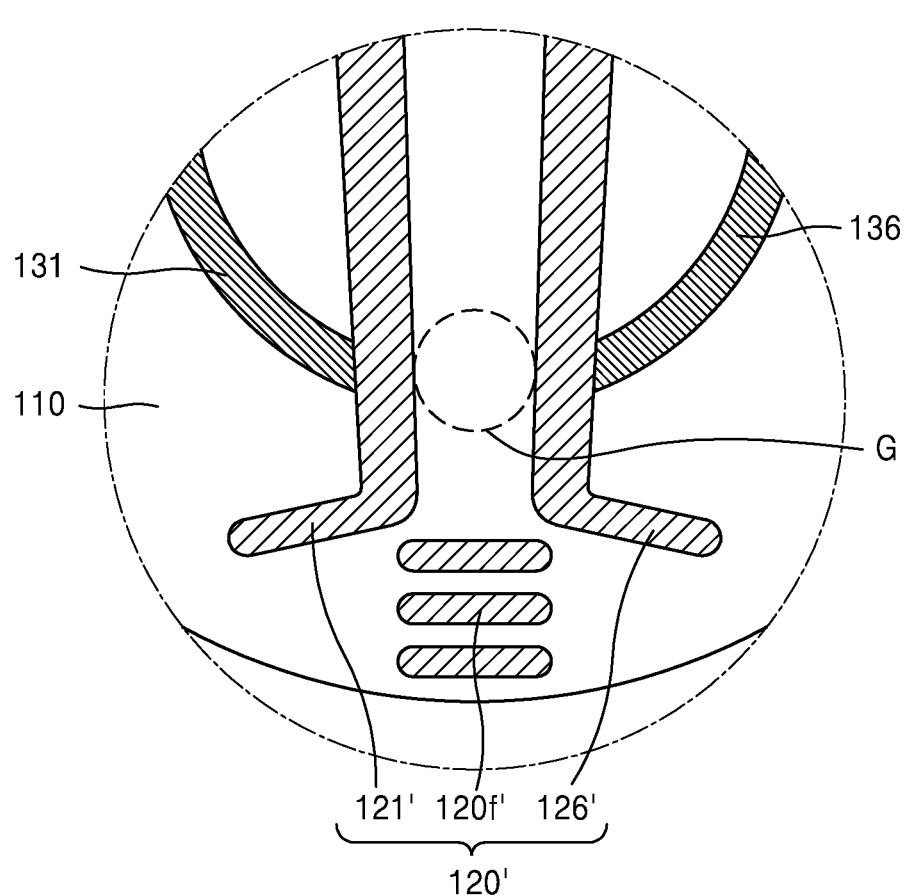
FIG. 3 is a diagram illustrating a probe according to some embodiments.

FIG. 3 is a diagram illustrating a probe 101 according to some embodiments. More specifically, FIG. 3 illustrates the same region as in FIG. 1B.

Referring to FIG. 3, the probe 101 may include the substrate 110, a receiver antenna 120', the first and second waveguides 131 and 136, and the first and second couplers 141 and 146 (see FIG. 1A).

The substrate 110, the first and second waveguides 131 and 136, and the first and second couplers 141 and 146 (see FIG. 1A) are substantially the same as described with reference to FIGS. 1A to 1C.

The receiver antenna 120' may include a dipole antenna. The receiver antenna 120' is based on the Yagi-Uda design. Accordingly, the receiver antenna 120' has a high signal-to-noise ratio and a broad field of view. The receiver antenna 120' may include a first antenna electrode 121', a second antenna electrode 126', and a feed 120f'.

An end portion of each of the first antenna electrode 121' and the second antenna electrode 126' may have a shape bent in a direction that is perpendicular to the extension direction of each of the first antenna electrode 121' and the second antenna electrode 126'. The feed 120f' may be provided in a plural number (e.g., a plurality of feed 102f may be provided) and may be arranged adjacent to the respective end portions of the first antenna electrode 121' and the second antenna electrode 126'.

Figure 4:
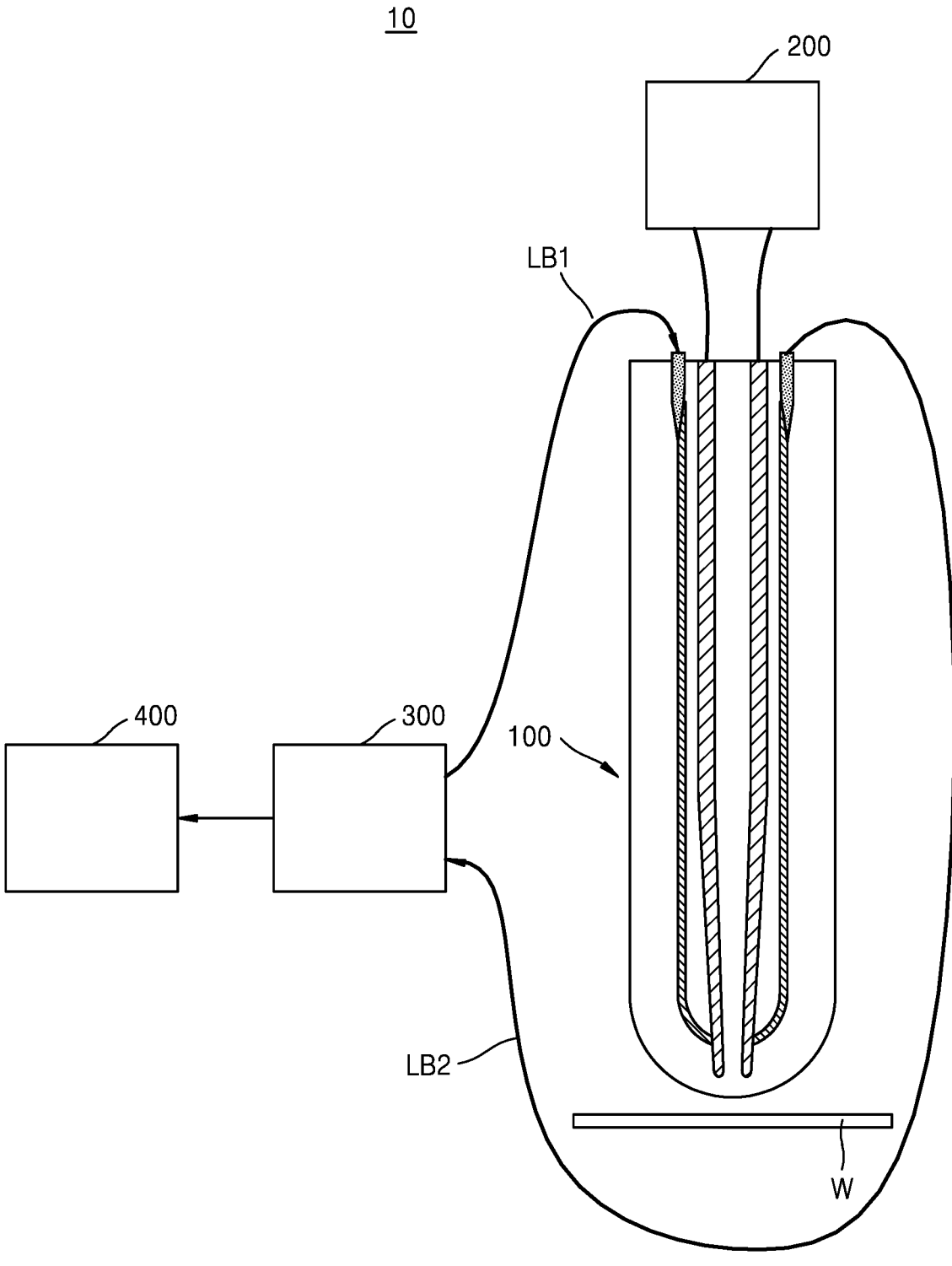
FIG. 4 is a diagram illustrating an inspection apparatus including a probe according to some embodiments.

FIG. 4 is a diagram illustrating an inspection apparatus 10 including the probe 100 according to some embodiments.

Referring to FIGS. 1 and 4, the inspection apparatus 10 may include the probe 100, a power supply 200, an optical system 300, and an analyzer 400.

The inspection apparatus 10 may nondestructively inspect an inspection object, such as a wafer W. The inspection object of the inspection apparatus 10 is not limited to the wafer W and may include an individualized and packaged semiconductor device or the like.

Although an example, in which a device under test inspected by the inspection apparatus 10 is the wafer W, will be mainly described hereinafter, those of ordinary skill could easily utilize the inspection apparatus 10 for inspecting semiconductor chips and semiconductor packages, based on descriptions given herein.

Here, two directions, which are parallel to an upper surface of the wafer W and orthogonal to each other, are respectively defined as the X direction and the Y direction, and a direction, which is perpendicular to the upper surface of the wafer W, is defined as the Z direction. Unless otherwise explicitly stated, the definitions of the directions are also identically applied to the following figures.

Here, the wafer W may include, for example, silicon (Si). The wafer W may include a semiconductor element, such as germanium (Ge), or a compound semiconductor, such as silicon carbide (SiC), gallium arsenide (GaAs), indium arsenide (InAs), and indium phosphide (InP). According to some embodiments, the wafer W may have a silicon-on-insulator (SOI) structure. The wafer W may include a buried oxide layer. According to some embodiments, the wafer W may include a conductive region, for example, an impurity-doped well. According to some embodiments, the wafer W may have various device isolation structures, such as a shallow trench isolation (STI) structure, for separating doped wells from each other.

The inspection apparatus 10 may inspect the wafer W having undergone a certain process. Here, the certain process may include various processes for forming a semiconductor device. The certain process includes, for example, an ion doping process, an oxidation process for forming an oxide film, a lithography process including spin coating, exposure, and development, a thin-film deposition process including chemical vapor deposition (CVD), atomic layer deposition (ALD), physical vapor deposition (PVD), and the like, a dry etching process, a wet etching process, a metal wiring process, and the like.

According to some embodiments, the inspection apparatus 10 may include an in-line inspection apparatus, which is included in various wafer processing apparatuses. Accordingly, the inspection apparatus 10 may inspect, in real time, the wafer W processed by a wafer processing apparatus. The wafer processing apparatus may include various equipment, for example, a stepper-type or scanner-type exposure apparatus, dry/wet-type etching equipment, plasma etching equipment, cleaner equipment, plasma asher equipment, polishing equipment such as chemical mechanical polishing (CMP) equipment, ion implantation equipment, PVD equipment, CVD equipment, ALD equipment, annealing equipment, and the like. However, aspects of the inventive concept are not limited thereto, and the inspection apparatus 10 may be separately provided outside the wafer processing apparatus.

The inspection apparatus 10 may include, for example, a terahertz time domain spectrometer. The inspection apparatus 10 may inspect the wafer W by providing, to the wafer W, a signal having a certain frequency band within a terahertz range (for example, about 0.1 THz to about 100 THz) and then by detecting a frequency-strength distribution of the signal that is reflected and/or transmitted by the wafer W.

According to some embodiments, the detecting of the frequency-strength distribution of the signal may include measuring time-intensity changes of the second laser beam transferred along the second waveguide 136 of the probe 100, and Fourier-transforming the measured time-intensity changes.

The inspection of the wafer W may be performed by comparison with a terahertz time domain spectrum of a standard wafer W. The inspection of the wafer W may include scanning inspection on the entire surface of the wafer W, or spot inspection on some regions of the wafer W.

The power supply 200 may be connected to the probe 100. The power supply 200 may supply AC and/or DC power for applying an AC and/or DC bias to the receiver antenna 120.

The optical system 300 may be configured to generate a first laser beam LB1. The first laser beam LB1 may include an ultrahigh frequency. The first laser beam LB1 may have a certain pulsing frequency. The first laser beam LB1 may have, but is not limited to, a wavelength of about 1560 nm. The optical system 300 may be configured to sense a second laser beam LB2. The optical system 300 may include a lock-in amplifier. According to some embodiments, a lock-in frequency of the optical system 300 may be the pulsing frequency of the first laser beam LB1. As another example, the lock-in frequency of the optical system 300 may be about ½ of the pulsing frequency of the first laser beam LB1.

The analyzer 400 may calculate a terahertz time domain spectrum by Fourier-transforming a time-intensity distribution of the second laser beam LB2. The analyzer 400 may be implemented by hardware, firmware, software, or any combination thereof. For example, the analyzer 400 may include a computing device, such as a workstation computer, a desktop computer, a laptop computer, a tablet computer, or the like. The analyzer 400 may include a simple controller, a complicated processor, such as a microprocessor, a central processing unit (CPU), or a graphics processing unit (GPU), a processor configured by software, or dedicated hardware or firmware. The analyzer 400 may be implemented by, for example, a general-purpose computer, or application-specific hardware, such as a digital signal processor (DSP), a field programmable gate array (FPGA), and an application-specific integrated circuit (ASIC).

While aspects of the inventive concept have been particularly shown and described with reference to embodiments thereof, it will be understood that various changes in form and details may be made therein without departing from the spirit and scope of the following claims.

What is claimed is:

1. An inspection apparatus comprising:
a substrate extending in a first direction and a second direction perpendicular to the first direction;
a receiver antenna arranged on the substrate and comprising first and second antenna electrodes;
a first waveguide on the substrate; and
a second waveguide on the substrate,
wherein the first antenna electrode overlaps the first waveguide in a third direction that is perpendicular to the first direction and the second direction, and
the second antenna electrode overlaps the second waveguide in the third direction.

2. The inspection apparatus of claim 1, wherein the first waveguide comprises:
a first lower cladding on the substrate;
a first core on the first lower cladding; and
a first upper cladding on the first core.

3. The inspection apparatus of claim 2, wherein the first antenna electrode is arranged between the substrate and the first lower cladding.

4. The inspection apparatus of claim 2, wherein the first antenna electrode is arranged between the first lower cladding and the first core.

5. The inspection apparatus of claim 2, wherein the first antenna electrode is arranged between the first core and the first upper cladding.

6. The inspection apparatus of claim 2, wherein the first core comprises a first base and a first protrusion protruding from the first base in the third direction.

7. The inspection apparatus of claim 6, wherein an end portion of the first antenna electrode overlaps the first base in the third direction.

8. The inspection apparatus of claim 6, wherein an end portion of the first antenna electrode overlaps the first protrusion in the third direction.

9. The inspection apparatus of claim 6, wherein the first antenna electrode comprises a bent portion contacting the first protrusion.

10. The inspection apparatus of claim 9, wherein the bent portion contacts an upper surface of the first protrusion.

11. The inspection apparatus of claim 9, wherein the bent portion contacts a first side surface of the first protrusion and a second side surface of the first protrusion, which is opposite to the first side surface of the first protrusion.

12. The inspection apparatus of claim 9, wherein the bent portion contacts a first side surface of the first protrusion and is apart from a second side surface of the first protrusion, which is opposite to the first side surface of the first protrusion.

* * * * *